US012793139B2

(12) United States Patent
Blanchett et al.

(10) Patent No.: US 12,793,139 B2
(45) Date of Patent: Nov. 10, 2026

(54) FINANCIAL SIMULATOR GUIDED BY INVESTOR UTILITY

(71) Applicant: The Prudential Insurance Company of America, Newark, NJ (US)

(72) Inventors: David Blanchett, Lexington, KY (US); Ashwini Chandrashekhar Jambekar, Foster City, CA (US); Marc Bothwell, New York, NY (US); Lawrence Julius Marchese, Stirling, NJ (US)

(73) Assignee: THE PRUDENTIAL INSURANCE COMPANY OF AMERICA, Newark, NJ (US)

( * ) Notice: Subject to any disclaimer, the term of this patent is extended or adjusted under 35 U.S.C. 154(b) by 0 days.

(21) Appl. No.: 18/108,360

(22) Filed: Feb. 10, 2023

(65) Prior Publication Data

US 2024/0273628 A1 Aug. 15, 2024

(51) Int. Cl.
*G06Q 40/06* (2012.01)

(52) U.S. Cl.
CPC .................................... *G06Q 40/06* (2013.01)

(58) Field of Classification Search
None
See application file for complete search history.

(56) References Cited

U.S. PATENT DOCUMENTS

| | | | | |
|---|---|---|---|---|
| 6,349,291 B1 * | 2/2002 | Varma | G06Q 40/04 | |
| 2004/0103052 A1 * | 5/2004 | Eapen | G06Q 40/02 | 705/36 R |
| 2005/0027632 A1 * | 2/2005 | Zeitoun | G06Q 40/06 | 705/36 R |
| 2007/0168302 A1 * | 7/2007 | Giovinazzo | G06Q 40/06 | 705/36 R |
| 2007/0250427 A1 * | 10/2007 | Robinson | G06Q 40/06 | 705/36 R |
| 2011/0087623 A1 * | 4/2011 | Greenstein | G06Q 40/10 | 705/36 R |
| 2013/0018818 A1 * | 1/2013 | Yadav | G06Q 40/06 | 705/36 R |
| 2016/0086277 A1 * | 3/2016 | Irlam | G06Q 40/06 | 705/36 R |
| 2021/0073048 A1 * | 3/2021 | Nakagawa | G06F 9/522 | |
| 2022/0366501 A1 * | 11/2022 | Fellowes | G06F 30/20 | |

* cited by examiner

*Primary Examiner* — Peter D Nolan
*Assistant Examiner* — Matthew Cobb
(74) *Attorney, Agent, or Firm* — Womble Bond Dickinson US LLP

(57) ABSTRACT

A method includes: receiving, by a computer system, investor information including an initial investment balance, an age of an investor, a current income, and a desired retirement age; configuring econometric models based on the investor information to compute a range of potential investment balances and a present value of decumulation, investor needs, investor wants, and account balances; simulating an investment portfolio of the investor over a plurality of simulation paths, each of the simulation paths corresponding to a different stochastic simulation of the investment portfolio over a plurality of periods based on the econometric models configured with the investor information; computing a goal completion score for each of the simulation paths based on an associated present value of assets and the investor wants and needs; generating advice based on the goal completion score for each of the simulation paths; and displaying the advice in a user interface.

20 Claims, 8 Drawing Sheets

Utility Function, Need=40% of Goal

Utility Function, Need=90% of Goal

FINANCIAL SIMULATOR GUIDED BY INVESTOR UTILITY

FIELD

Aspects of embodiments of the present disclosure generally relate to investments, in particular simulating performance of a portfolio based on investor goals.

BACKGROUND

Retirement planning is a challenging process involving managing uncertainty with respect to market conditions, the assets available for investment, and the personal characteristics of the investors, including personal preferences of those investors. It can be difficult for investors to appreciate the wide range of possible investment outcomes and the impact of choices that those investors make with respect to saving and spending.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure relate to computer-implemented simulation methods to create individual retirement scenarios that are personalized for investors and to generate recommendations based on the results of the simulated retirement scenarios.

According to one embodiment of the present disclosure, a method includes: receiving, by a computer system including a processing circuit and memory, investor information including an initial investment balance, an age of an investor, a current income, and a desired retirement age; configuring, by the computer system, econometric models based on the investor information to compute a range of potential investment balances and a present value of decumulation, investor needs, investor wants, and account balances; simulating, by the computer system, an investment portfolio of the investor over a plurality of simulation paths, each of the simulation paths corresponding to a different stochastic simulation of the investment portfolio over a plurality of periods based on the econometric models configured with the investor information; computing, by the computer system, a goal completion score for each of the simulation paths based on an associated present value of assets and the investor wants and needs; generating, by the computer system, advice based on the goal completion score for each of the simulation paths; and displaying the advice in a user interface connected to the computer system.

The advice may be generated by the computer system in near real-time in response to receiving the investor information.

The plurality of simulation paths may be distributed across multiple processing circuits executing in parallel.

The econometric models may include: a first econometric model configured to perform stochastic estimation of the range of potential investment balances over a period; and a second econometric model configured to compute the present value of decumulation wants, needs, and account balances over the period.

The method may further include computing an investor utility metric for each of the plurality of periods of a simulation path of the simulation paths, the goal completion score associated with the simulation path of the simulation paths may be computed based on the investor utility metric computed for corresponding ones of the plurality of periods of the simulation path, and the investor utility metric may be computed based on a non-linear utility function in accordance with the investor needs and the investor wants.

The non-linear utility function may assign poor utility to adverse outcomes and reduced marginal utility to positive outcomes.

The simulating a period of the plurality of periods of a simulation path of the simulation paths may include: applying starting balances, income, withdrawals, savings rates, and simulated asset allocation returns to stochastic simulation of asset returns and spending for the period; computing updated investor information for an end of the period; and computing a funded ratio for the investor for the period.

The investor information may further include at least one selected from a group including: health information regarding the investor; spending desires of the investor; a gender of the investor; and information regarding a spouse of the investor.

The method may further include: receiving additional investor information; reconfiguring the econometric models based on the additional investor information; simulating the investment portfolio of the investor over a second plurality of simulation paths, each of the second plurality of simulation paths corresponding to different stochastic simulations of the investment portfolio over a plurality of periods based on the econometric models configured with the additional investor information; computing, by the computer system, a second goal completion score for each of the second plurality of simulation paths based on an associated present value of assets and the investor wants and needs; generating, by the computer system, updated advice based on the second goal completion score associated with each of the second plurality of simulation paths; and displaying the updated advice in the user interface connected to the computer system.

According to one embodiment of the present disclosure, a system includes: a processing circuit; and memory storing instructions that, when executed by the processing circuit, cause the processing circuit to: receive investor information including an initial investment balance, an age of an investor, a current income, and a desired retirement age; configure econometric models based on the investor information to compute a range of potential investment balances and a present value of decumulation, investor needs, investor wants, and account balances; simulate an investment portfolio of the investor over a plurality of simulation paths, each of the simulation paths corresponding to a different stochastic simulation of the investment portfolio over a plurality of periods based on the econometric models configured with the investor information; compute a goal completion score for each of the simulation paths based on an associated present value of assets and the investor wants and needs; generate advice based on the goal completion score for each of the simulation paths; and display the advice in a user interface.

The system may be configured to generate the advice in near real-time in response to receiving the investor information.

The instructions to simulate the investment portfolio include instructions to distribute the simulation paths across multiple processing circuits executing in parallel.

The econometric models may include: a first econometric model configured to perform stochastic estimation of the range of potential investment balances over a period; and a second econometric model configured to compute the present value of decumulation wants, needs, and account balances over the period.

The memory may further stores instructions that, when executed by the processing circuit, cause the processing circuit to compute an investor utility metric for each of the plurality of periods of a simulation path of the simulation paths, the goal completion score associated with the simulation path of the simulation paths may be computed based on the investor utility metric computed for corresponding ones of the plurality of periods of the simulation path, and the investor utility metric may be computed based on a non-linear utility function in accordance with the investor needs and the investor wants.

The non-linear utility function may assign poor utility to adverse outcomes and reduced marginal utility to positive outcomes.

The instructions to simulate a period of the plurality of periods of a simulation path of the simulation paths may include instructions that, when executed by the processing circuit, cause the processing circuit to: apply starting balances, income, withdrawals, savings rates, and simulated asset allocation returns to stochastic simulation of asset returns and spending for the period; compute updated investor information for an end of the period; and compute a funded ratio for the investor for the period.

The investor information may further include at least one selected from a group including: health information regarding the investor; spending desires of the investor; a gender of the investor; and information regarding a spouse of the investor.

The memory may further store instructions that, when executed by the processing circuit, cause the processing circuit to: receive additional investor information; reconfigure the econometric models based on the additional investor information; simulate the investment portfolio of the investor over a second plurality of simulation paths, each of the second plurality of simulation paths corresponding to different stochastic simulations of the investment portfolio over a plurality of periods based on the econometric models configured with the additional investor information; compute a second goal completion score for each of the second plurality of simulation paths based on an associated present value of assets and the investor wants and needs; generate updated advice based on the second goal completion score associated with each of the second plurality of simulation paths; and display the updated advice in the user interface.

According to one embodiment of the present disclosure, a non-transitory computer readable medium stores instructions that, when executed by a processing circuit, cause the processing circuit to: receive investor information including an initial investment balance, an age of an investor, a current income, and a desired retirement age; configure econometric models based on the investor information to compute a range of potential investment balances and a present value of decumulation, investor needs, investor wants, and account balances; simulate an investment portfolio of the investor over a plurality of simulation paths, each of the simulation paths corresponding to a different stochastic simulation of the investment portfolio over a plurality of periods based on the econometric models configured with the investor information; compute a goal completion score for each of the simulation paths based on an associated present value of assets and the investor wants and needs; generate advice based on the goal completion score for each of the simulation paths; and display the advice in a user interface.

The instructions may configure the processing circuit to generate the advice in near real-time in response to receiving the investor information.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
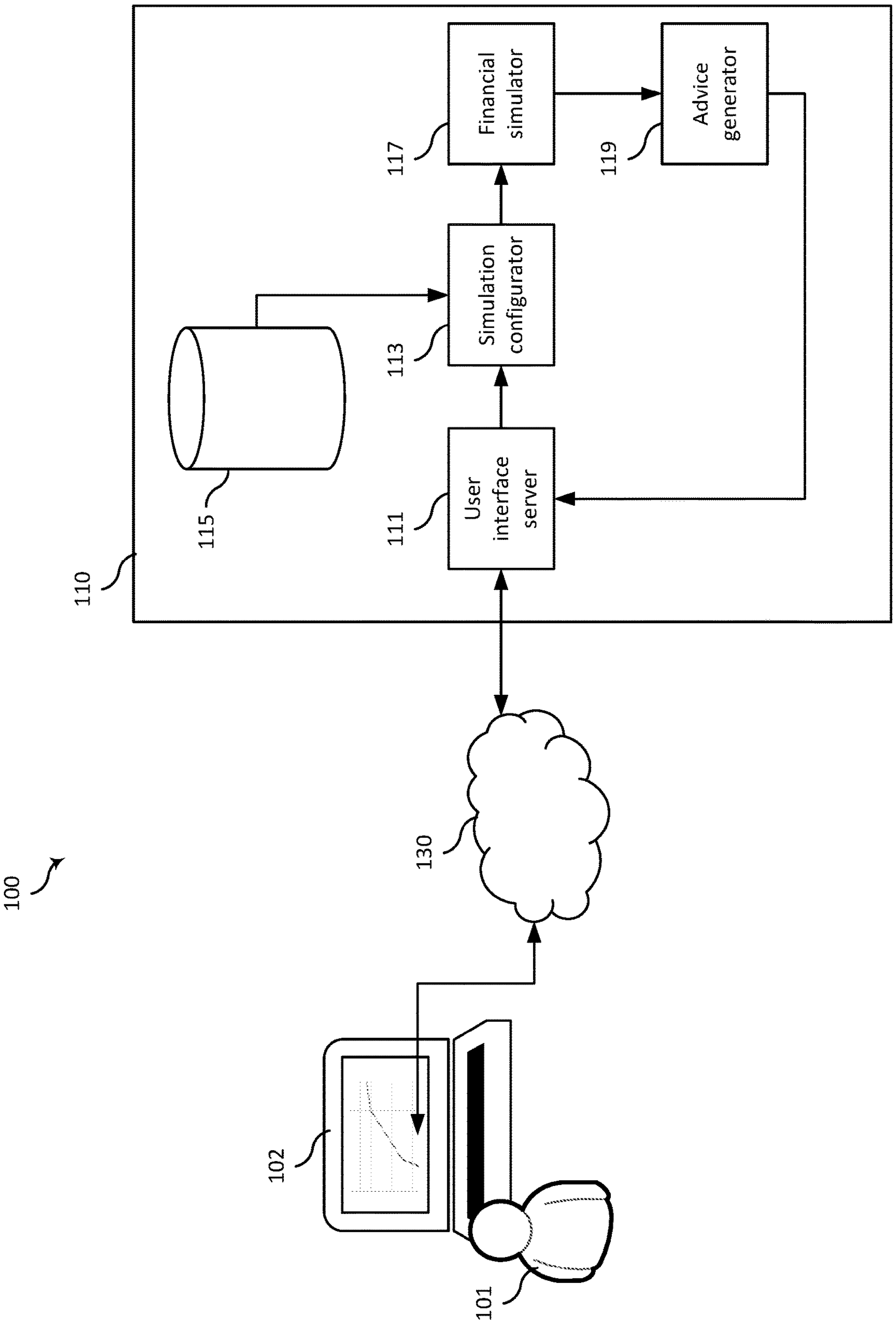
FIG. 1 is a schematic block diagram of a system configured to perform financial simulations according to one embodiment of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present disclosure relate to computer-implemented simulation methods to create individual retirement scenarios that are personalized for investors and to provide asset allocation, retirement age and savings advice based on the results of the simulated retirement scenarios. The simulated retirement scenarios are customized based on personal characteristics of those investors, such as age, income, and assets, as well as based on personal preferences of those investors, such as allocation of spending between necessities (needs) and luxuries (wants).

Some aspects of the present disclosure relate to flexible advice computation, where the advice is personalized in accordance with the amount of information that is provided about the investor. For example, a minimum set of information (e.g., current age and retirement savings account balances) may be sufficient to generate initial simulation results for the investor, and the simulation and advice computation may be further tailored as the investor provides additional information (e.g., other accounts and balances corresponding to assets, additional income sources, desired decumulation spending rate, health status information, gender, education, desired location of residence, and the like). Further engagement may provide additional information about a spouse and/or other family members (e.g., providing additional income sources, holding additional assets, representing additional allocations of spending, and the like). Systems according to embodiments of the present disclosure adapt to missing data points and produce advice based on the known information set.

Some aspects of embodiments of the present disclosure further relate to performing the simulations rapidly (e.g., with low computational latency on the order of seconds) while generating technically accurate and tailored advice based on models of asset performance. As such, users receive near real-time feedback in response to the additional information (e.g., assets, spending choices, and the like), so that users can immediately see the impact of their choices on the simulation results. In some embodiments, the near real-time refers to a response time of less than 5 seconds and, in some embodiments, near real-time refers to a response time of less than one second (sub-second latency). Users can then make further changes based on those new simulation results, which enables an interactive approach to financial planning. This improves user (investor) engagement in the planning process compared to other techniques that may require waiting several minutes (or even tens of seconds) between simulations (thereby limiting the number of different scenarios that can be practically simulated during a planning session before exhausting user patience) or that may perform more general advice that is not specifically tailored to the investor's specific combination of assets, personal circumstances, and preferences.

As used herein, an investor may refer to a person (e.g., prospective or current retiree) who may have a salary, at least one investment account with an associated tax status, and a current age that they communicate to the system. The investor may be represented by a party acting on behalf of investor (e.g., an agent or guardian). The investor may have a particular financial goal. As used herein, sponsors are groups of users, for example, but not limited to, a retirement plan sponsor. An investor may also be referred to herein as a participant in that they are participating in a retirement plan.

As used herein, utility is a numerical estimate or representation of the satisfaction or happiness that an investor experiences by consuming (e.g., spending assets), either during retirement or for some other goal. If the investor is unable to pay for basic necessities, the expected utility is low with diminishing marginal utility. Conversely, if the investor is able to fully fund all wants and wishes over and above basic necessities, their expected utility is high.

FIG. 1 is a schematic block diagram of a system 100 configured to perform financial simulations according to one embodiment of the present disclosure. As shown in FIG. 1, a user 101 (e.g., an investor or an advisor working with an investor) may interact with the system 100 through an end-user device 102 or client device. The end-user device 102 may be a computing device such as a laptop computer, a desktop computer, a smartphone, a tablet, and the like. The computing device may execute dedicated client software (e.g., a software application running on a computer or an "app" running on a smartphone or tablet) or may execute a web browser that provides an interface with an web application (or web app) accessed via a computer network. In some embodiments, the computing device (e.g., the software application or the web browser) communicates with a server computer system 110 over a computer network 130 (such as the Internet) to perform financial simulations according to embodiments of the present disclosure. Aspects of embodiments of the present disclosure will be described herein in the context of providing user inputs from the end-user device 102 to the server computer system 110, where the server computer system 110 returns results of the analysis to the end-user device 102. However, embodiments of the present disclosure are not limited thereto and, in some embodiments of the present disclosure, portions of the computational processes are distributed between the server computer system 110 and the end-user device 102 (e.g., where the end-user device 102 may perform some additional processing locally).

In addition, the server computer system 110, in some embodiments, represents multiple computers, where various aspects of the computational processes may be distributed over multiple server computers, such as different computers specialized to handle different parts of the computational tasks (e.g., web servers for processing user interactions versus compute servers that may include high performance processors and specialized accelerators for performing simulations), and where multiple server computers may operate in parallel (e.g., reducing latency by distributing the computational processes over multiple servers operating at the same time on different parts of the problem), examples of which will be discussed in more detail below. In some embodiments, the multiple computers may be distributed within a data center or across multiple data centers.

In the example embodiment shown in FIG. 1, the end-user device 102 communicates over the computer network 130 with a user interface server 111 of the server computer system 110. As noted above, in a case where the end-user device 102 executes a web browser that communicates with the server computer system 110, the user interface server 111 may be implemented by one or more web servers that communicate using hypertext transfer protocol (HTTP), and that may receive requests through HTTP commands (e.g., GET and POST commands) and that return responses to the web browser of the end-user device 102 in formats including hypertext markup language (HTML), executable scripts (e.g., JavaScript), and formatted data (e.g., JavaScript Object Notation {JSON) or Extensible Markup Language (XML)), where the user interface server 111 may also implement an application programming interface (API) to provide the web browser on the client side with dynamic, incremental updates to a web page without requiring a reload of the entire web page. In some embodiments, such as where the end-user device 102 executes a standalone application or app, the user interface server 111 may similarly implement an API for receiving user input from the end-user device 102 and returning simulation results to the end-user device 102 via the computer network 130.

Figure 2:
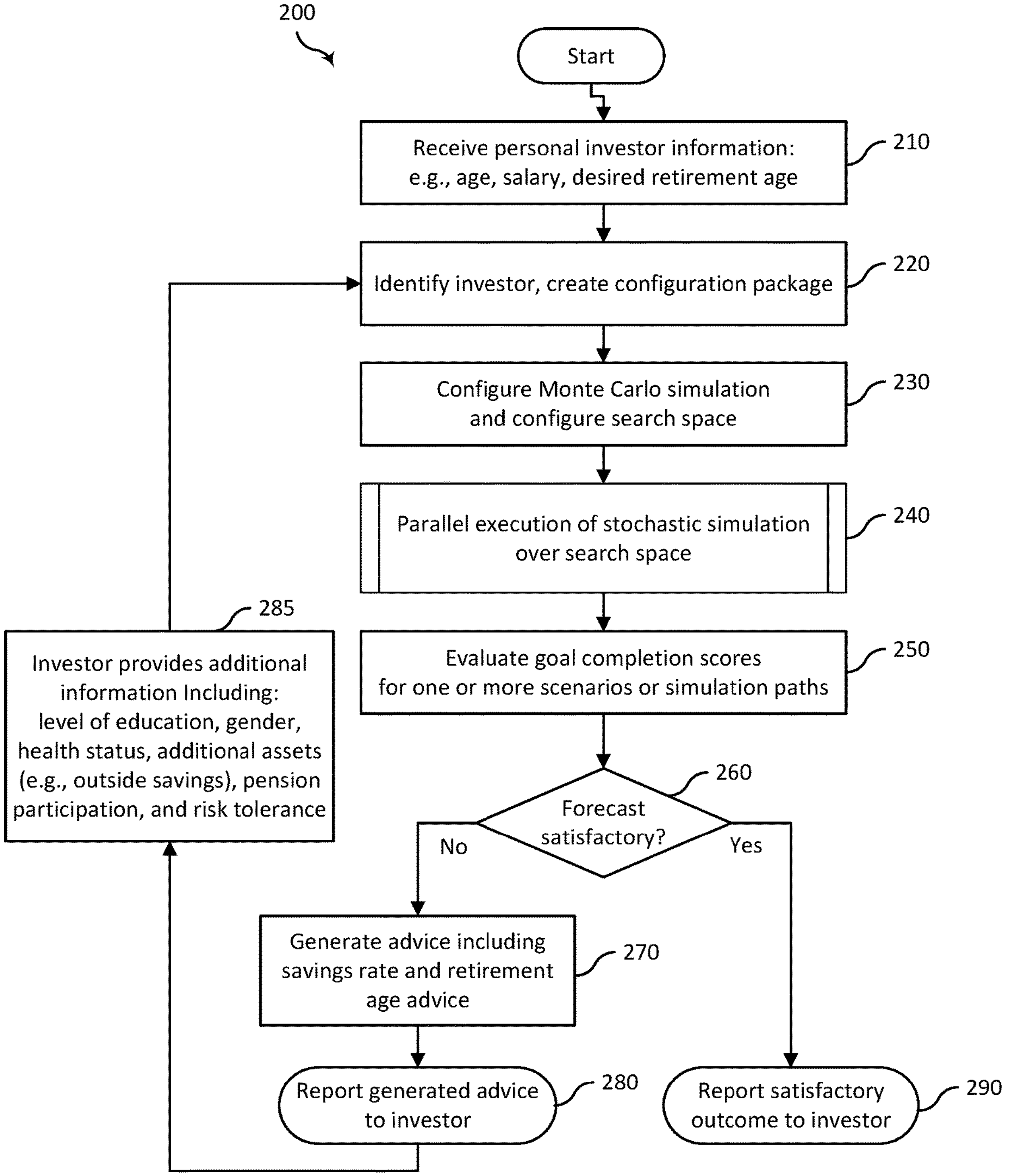
FIG. 2 is a flowchart of a method for configuring a financial simulation based on user input and generating advice based on the results of the financial simulation according to one embodiment of the present disclosure.

FIG. 2 is a flowchart of a method 200 for configuring a financial simulation based on user input and generating advice based on the results of the financial simulation according to one embodiment of the present disclosure. The method 200 computes estimated retirement income projections and generates the advice to maximize the utility of the investor (e.g., an estimate of the happiness or satisfaction of the investor) and reports actionable guidance relating to accomplishing the investor's spending goals.

An investor's spending goals can be decomposed into separate streams of spending, which can generally be grouped into essential spending ("needs") and discretionary spending ("wants"). Needs spending is assumed to be relatively inflexible, for example, food or health care (i.e., more essential) expenditures. Wants spending are more flexible expenditures, such as travel or other optional consumption. For example, it is presumed that an investor will first spend to ensure that their needs are met, then gain additional utility by spending on their wants. Having insufficient assets to satisfy at least the investor's needs in a given time period (e.g., year) may be assumed to have low or even negative utility, indicating that it is a situation to be avoided (if possible) through financial planning. The ability to fund these categories is therefore passed through a non-linear utility model or utility function that is configured such that, when falling short of goals, a marginally decreasing utility exists at a greater absolute rate than the utility of exceeding goals.

In some embodiments, a stochastic simulation, such as a Monte Carlo simulation, is used to perform the computations of the values of financial assets over a period of time, such as the remaining expected lifetime of the investor. In some embodiments of the present disclosure, other types of stochastic simulations are applied to perform computations of the values of financial assets, such as a binomial tree, with different tradeoffs based on factors such as computational complexity and support for non-linear asset return profiles. This remaining lifetime may include some number of years where the investor is earning income, followed by some number of years of retirement. The simulation may be divided into a series of steps or iterations, each iteration corresponding to a period (e.g., 6 months or one year). During each step, the computer system simulates the financial performance of the investments for the corresponding period (e.g., with a range of possible outcomes, such that multiple simulations may be generated, in accordance with the distribution of possibilities).

During each step, the simulation makes asset allocation, tax liquidation, and spending adjustment recommendations to simulate the range of possible and likely investors' actions when faced with retirement decisions. For example, each step of the simulation may correspond to a different year, and the simulated investors' actions may correspond to different possible adjustments of their investment portfolio and investing strategy during an annual review of their financial progress toward retirement. The decisions may be made based on a financial strategy specified by the investor, such that the investor can explore the possible outcomes of choosing different strategies.

In more detail, at operation 210, the server computer system 110 receives personal participant information regarding the investor, such as age, salary, and desired retirement age. As noted above, this user input may be provided through client software (e.g., an app or a web browser) running on the end-user device 102 and provided to the user interface server 111 of the server computer system 110 through the computer network 130. In some embodiments, minimum information about the investor is current age, and savings information, like account balance(s) and tax filing status (e.g., in the United States, whether the investor is filing their taxes as a single person, as a married person filing jointly, or as a married person filing separately).

Additional information improves the quality of the simulation and includes, but is not limited to, spousal account balances, gender (e.g., which may be used to adjust life expectancy), health related information (e.g., self-evaluated health status, which may be used to estimate healthcare spending needs over time and life expectancy), educational attainment, spousal health information, spousal salary information, savings projections and future, and non-constant cash flows. The additional information may be provided at the start of the process or may be incrementally added after performing one or more runs of the simulation at operation 285, discussed in more detail below.

At operation 220, the server computer system identifies the participant and creates a configuration package, such as by supplying the participant information to a simulation configurator 113. The simulation configurator 113 may also take information from a database 115, where the database 115 stores information that may be used to fill in missing portions of the configuration (e.g., where specific values were not provided by the user 101 through the end-user device 102 to the user interface server) and to supply other information for configuring the simulation. This structure allows the simulation system to be updated easily and adaptively to reflect current economic, legal, and actuarial conditions.

As one example of additional general information that may be useful for configuring the simulation, tax rates may change annually and therefore in some embodiments the database 115 stores information about current tax rates and upcoming changes in tax rates (e.g., as currently enacted into law, based on effective dates of those changes in the tax rates). As another example, current interest rates and expectations of future interest rate changes may vary over time.

As noted above, investors may provide incomplete personal investor information for configuring the simulation. While some embodiments will accept a minimum of current age, and savings information, like account balance(s) and tax status. One goal of the financial advising process is to ensure that the investor's financial needs are met throughout their remaining life, and therefore the investor's life expectancy is an important variable for the simulation (e.g., more years of retirement means that the assets must be able to support the retiree for a longer period of time). Without providing such information initially, it may be necessary to fill in generic information to configure the simulation. For example, without gender information, life expectancy may be estimated based on overall populations rather than male versus female life expectancies, and current annual income may be assumed to be zero. Accordingly, in some embodiments, the database 115 stores generic information that is used to fill in portions of the investor information that are missing.

In some embodiments, the database 115 stores more tailored information based on the population that the investor is known to be a part of. For example, in some circumstances, the financial planning advice is provided to the investor as a benefit from their employer. In such a case, the employer may provide general information regarding their employees (e.g., the user base of investors accessing the system a part of the employer program). For example, the base salary assumptions of an investor, which impacts the estimate of their social insurance income (e.g., United States social security income), may be refined if the employer provides specific information about its employee population or they can be varied based on factors such as the industry of the employer. As another example, access to the financial planning advice may be provided by a trade union or other trade organization that has detailed information about its investors, in which case the salary curves can be modified in order to develop a realistic salary curve for the investor and thus a more accurate estimate of social insurance income. This fine-grained configuration concept can be utilized to create additional employer-based assumptions. In another example, if an employer has a generous pension plan, that may change the risk aversion and glidepath for determining the risk of the portfolios as well as expected income during retirement. Furthermore, some employers may offer different levels of pension benefits based on years of service and/or retirement age, such that the simulations account for the expected pension benefit based on the simulated retirement age. This is configurable and this configuration is selected when the investor requests a computation.

At operation 230, the simulation configurator 113 of the server computer system 110 configures a stochastic simulation (e.g., a Monte Carlo simulation) of the financial performance of assets associated with the investor and configures the search space for the stochastic simulation. The search space in some embodiments includes a combination of two or more of: retirement ages, savings rates, and spending goals (which can be determined by configuration). In some embodiments of the present disclosure, the configuration of the search space includes identifying combinations of parameters (e.g., retirement ages, savings rates, and spending goals) to be simulated.

A full simulation is run for each of the combinations and the most plausible option is reported to the investor. (For example, an investor cannot be expected to work to 100, even if their planned retirement age is 80.)

In some embodiments of the present disclosure, configuring the stochastic simulation includes computing an estimated end of retirement via an actuarial model. The actuarial model considers a variety of relevant mortality risk factors from the configuration package of investor information, including smoking status (e.g., does the investor smoke tobacco), self-assessed health, income, length of time until retirement, and gender. In the absence of the optional factors, the simulation configurator 113 makes basic actuarial assumptions. As the quality of the information provided improves (e.g., with additional information provided by the investor), the accuracy of the life expectancy estimate also improves. The end of retirement minus the desired retirement age equals the number of years of retirement that the investor seeks to fund. In some embodiments, the simulation configurator 113 also applies mortality weights to the retirement period, where the entire period is viewed probabilistically versus effectively fixed. In some embodiments, social insurance income estimations are computed as part of the configuration of the stochastic simulation (e.g., based on the investor's current income). In addition, in some embodiments, if investor needs and wants are not provided as a part of the investor input, configuring the stochastic simulation includes computing investor needs and wants based on demographic models (e.g., configurable in accordance with current demographic studies regarding various populations) and income estimates. Additional examples of information that is included in a configuration package include but are not limited to: bequest preference; retirement location (e.g., a state in the United States); account asset allocation; and risk aversion. Various embodiments of the present disclosure relate to modifying the investor glide-path within the simulation based on these factors, where the particular impact depend on the particular piece of information. For example, retirement location has an impact on estimated cost of living, thereby impacting the cost of satisfying investor needs and wants. As another example, risk aversion may impact how an investor allocates their assets among different asset classes (e.g., stocks versus bonds)

At operation 240, the server computer system 110 executes the stochastic simulation over the search space. For example, the stochastic simulation may be executed by a financial simulator 117. The financial simulator 117 may include program instructions that are executed across a plurality of processing circuits of the server computer system 110. The plurality of processing circuits may include, e.g., different cores of a single central processing unit (CPU), multiple multi-core CPUs, combinations of CPUs and accelerators such as graphics processing units (GPUs) and artificial intelligence accelerators, and the like. In addition, in some embodiments, the plurality of processing circuits may be distributed across multiple computers, where different computers may communicate through a computer network interface and using computer network protocols such as transmission control protocol/internet protocol (TCP/IP), and where the computers may be separate physical machines or virtual machines.

In more detail, the financial simulator 117 may run multiple different simulations in parallel, where the different simulations correspond to different portions of the search space that was configured at operation 230. This is possible because, according to some embodiments of the present disclosure, different simulations can be executed independently of one another (e.g., performing one simulation does not depend on the results of another simulation), such that a large number of computing resources can concurrently or simultaneously work on different parts of the simulation (e.g., different portions of the search space corresponding to different combinations of retirement age and saving rate, as well as for different simulation paths corresponding to different randomized asset performance results) to produce results across the entire search space in near real-time (e.g., on the order of single-digit seconds, such as less than 5 seconds, or less than one second). This low latency is achieved through a combination of methods including implementing the core computation using low level programming paradigms and languages; caching necessary data; search space optimization having the effect of limiting the amount of computation; and scaling the computation across many processors.

In some embodiments of the present disclosure, the financial simulator 117 performs a stochastic simulation (e.g., a simulation that uses variables that represent values that are set randomly when running the simulation). In some embodiments, the financial simulator uses a random matrix of asset returns derived from a covariance matrix and return estimation of relevant asset classes. This random matrix allows the financial simulator 117 to assess accumulation in retirement accounts, asset returns for those accounts, and decumulation estimates.

Figure 3:
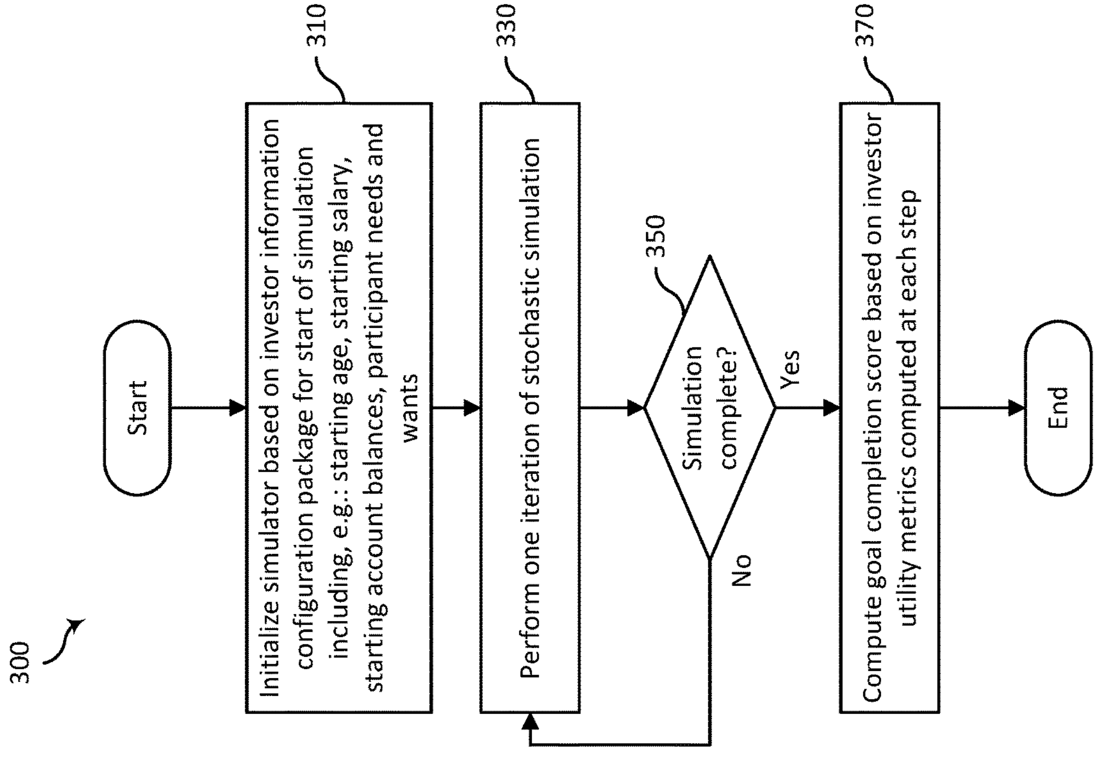
FIG. 3 is a flowchart of a method for running a financial simulation based on user input according to one embodiment of the present disclosure.

FIG. 3 is a flowchart of a method 300 for running a financial simulation based on user input according to one embodiment of the present disclosure. At operation 310, the financial simulator 117 initializes a simulation based on the investor information configuration package that was computed at operation 220 by the simulator configurator 113 and used to configure the simulator at operation 230 of FIG. 2.

At operation 330, the financial simulator 117 performs one step or one iteration of a stochastic simulation. As noted above, the simulation is divided into a series of steps or iterations, where each iteration corresponds to a period of time (e.g., 6 months or a year).

Figure 4:
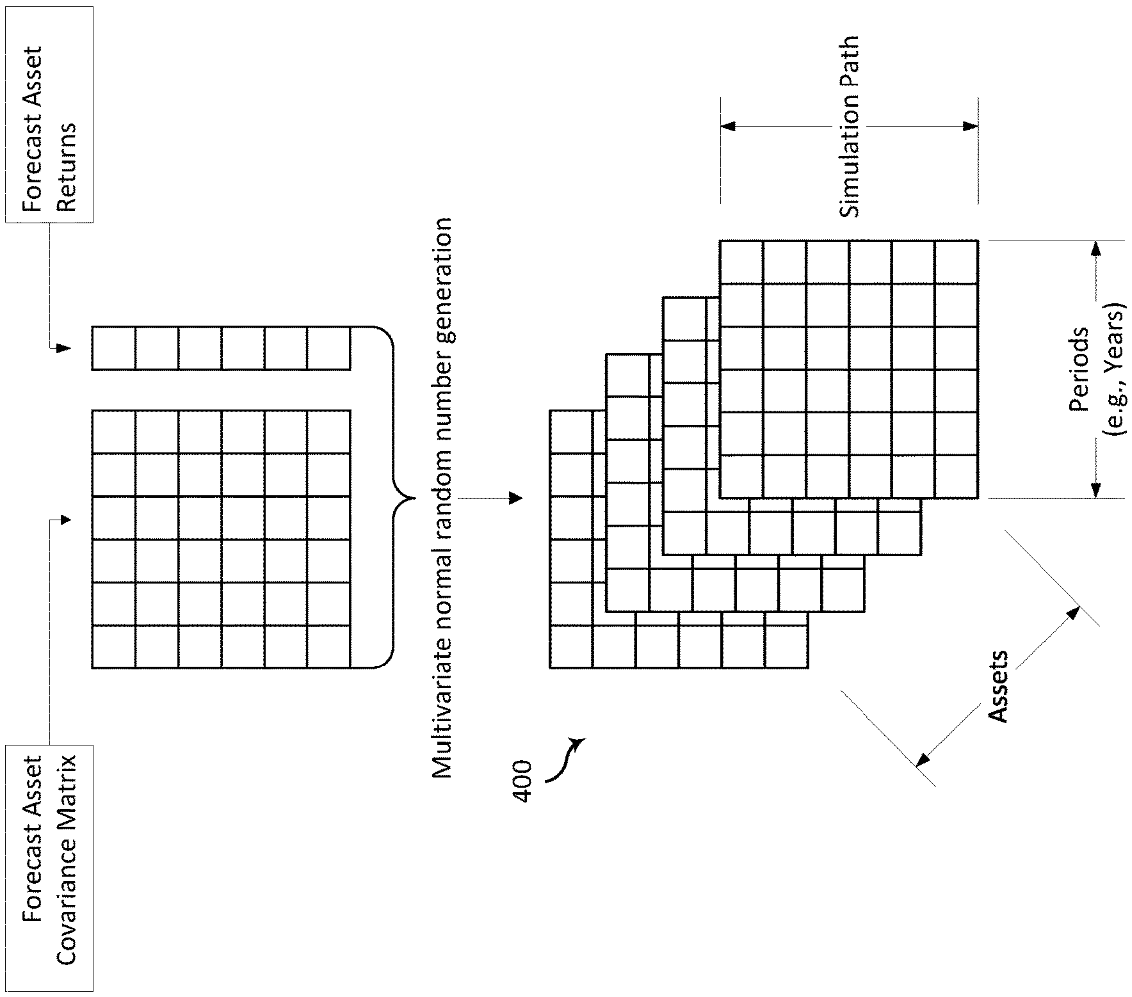
FIG. 4 is a schematic representation of the simulation process as expressed by matrices according to one embodiment of the present disclosure.

FIG. 4 is a schematic representation of the simulation process as expressed by matrices according to one embodiment of the present disclosure. A random matrix is generated by utilizing forecasts of the mean and covariance of asset class returns. For example, if large capitalization stocks are forecast to return 6% per year over the long run with an annual standard deviation of 20% per year, a series of random returns which comport with that distribution are generated. Random returns are thus generated for an entire matrix based upon the asset class estimates of mean, variance, and covariance. If there are 20 asset classes, then 20 random returns (one for each asset class) are generated for year one of one particular simulation path. A distinct set of asset returns are generated for year two for that simulation path. This process continues until the entire matrix is populated and each simulation path has 20 asset class returns for each year.

According to some embodiments of the present disclosure, the stochastic simulation is implemented as a Monte Carlo simulation that is based on a random matrix 400 which has 3 axes: simulation path, periods (e.g., years), and assets. This stochastic simulation implements an investment balance econometric model for stochastic estimation of a range of potential investment balance. In some embodiments, the random matrix is generated once and is reused between simulation runs (e.g., between iterations of the loop shown in FIG. 2) in order to improve reproducibility in the simulation results (e.g., so that the simulator generates the same results if the same configuration package was provided to the simulator). Each simulation path represents one possible outcome of an investor's financial scenario. If, for example, a simulation is computing year 1 in simulation path 1, there is a complete set of simulated asset returns affecting the investment portfolios. Based on the glide path and asset allocation, an investment portfolio will have a return. These returns are computed for each portfolio at each step thereby estimating the total value of the portfolios. Each path is computed sequentially through years, thus building portfolio values, tax exposures, etc. The number of simulation paths can be, for example, 10,000 or 1,000, thus building a distribution of outcomes. Viewing one simulation path means traversing sequentially through periods (e.g., years) with each period having a series of asset returns (e.g., corresponding to different assets). Thus, along one simulation path, at one period, the model contains randomized returns for each asset. A step or iteration is defined as one period along a particular simulation path. For example, if the simulation calls for 60 one-year periods (current age subtracted from end of retirement, e.g., 95−35=60) and there are 1,000 simulation paths, there are 60×1,000=60,000 steps or iterations to be computed (noting that the 1,000 simulation paths are independent of one another and therefore can be run in parallel, but that each successive step within a simulation path depends on the result of the previous step). A simulation is run by computing metrics, wants spending adjustments, asset allocations, simulated account liquidations, including computing and accounting for tax liabilities, at each step or iteration.

Figure 5:
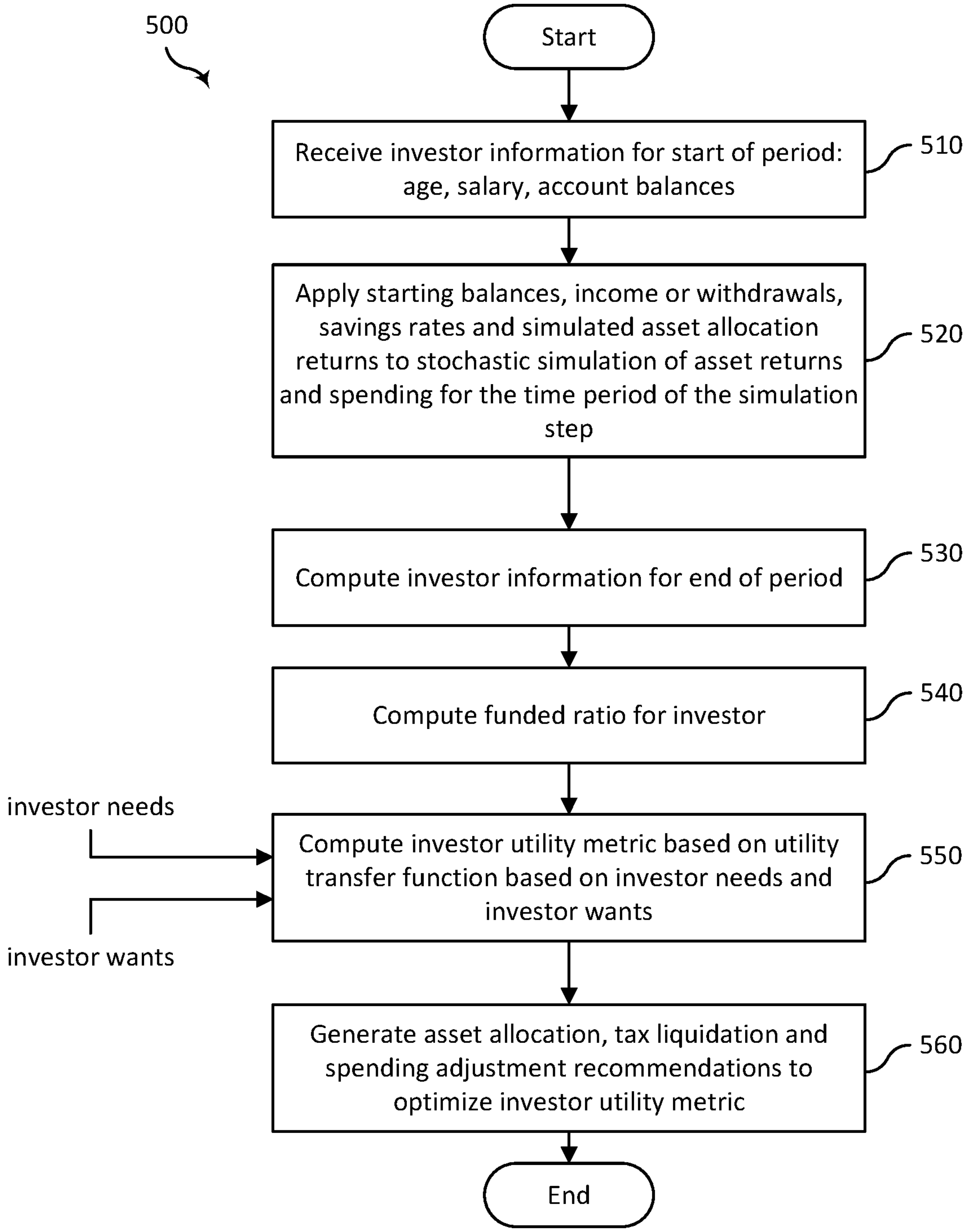
FIG. 5 is a flowchart of a method for performing an iteration of a financial simulation according to one embodiment of the present disclosure.

FIG. 5 is a flowchart of a method 500 for performing an iteration of a financial simulation according to one embodiment of the present disclosure. As noted above, each iteration corresponds to a period of time, such as one year. At operation 510, the financial simulator receives participant information for the start of the period, such as the age, salary, and account balances. In some embodiments, if an investor does not provide an estimate of their needs and wants, a spending goal distribution econometric model estimates the spending goal distribution of needs and wants (e.g., based on demographic information about the investor). This distribution becomes the base liability which is used in the simulation.

At operation 520, the financial simulator 117 applies starting balances, income or withdrawals, savings rates and simulated asset allocation returns to stochastic simulation of asset returns and spending for the time period of the simulation step (the iteration of the simulation).

At operation 530, the financial simulator 117 computes forecast account balances for the end of the period based on starting balances, income or withdrawals, savings rates, and simulated asset allocation returns at each simulated period (e.g., each simulated year). At the beginning of a simulation period (e.g., a simulated year), each investor account has as starting value. During that simulation period, if the investor is accumulating (e.g., during periods prior to retirement), then savings including employer contributions (subject to statutory maximums of the account type, such as tax-advantaged retirement accounts) are deposited into the account. If the investor is decumulating (e.g., during periods after retirement), account withdrawals net of estimated taxes are used to fund spending goals in excess of what can be funded by pension and social insurance income. These cash flows into and out of accounts, in addition to investment returns, yield the end of year account values. The end of year account values are the starting account values for the following year, and the cycle repeats until reaching the end of retirement (e.g., based on life expectancy of the investor).

To simulate a retiree's likely behavior, funded ratios are estimated for each year of run of the simulation and spending may be adjusted depending on how the value evolves in a given simulation path. At operation 540, the financial simulator 117 computes a funded ratio for the participant or investor. At each simulated period, the financial simulator 117 compares the present value of the liabilities to the present value of the forecast social insurance payment stream (e.g., social security income) and the assets (e.g., account balances of the assets) to create a "funded ratio."

The funded ratio is a metric within the system used to estimate the likelihood of a retiree to fund their goal: consumption during retirement. The funded ratio is defined as the total value of assets, which include cash flows, adjusted by the appropriate discount rate, divided by the total value of the liabilities, which are also adjusted by the appropriate discount rate. Total assets include current balances and future expected inflows, such as future savings, social insurance (e.g., Social Security) retirement benefits, annuity income, and pensions. Total liabilities are the sum of the two spending groups: all future needs spending plus all future wants spending (as well as potentially other cash flows the user includes in the projection, for example a bequest). A funded ratio of 1.0 implies that a prospective retiree has just enough assets to fully fund the retirement goal or fully funded. Funded ratios below 1.0 imply under-funding, and similarly, ratios above 1.0 imply a surplus. If the funded ratio is greater than one, the desired spending during retirement is said to be over funded. As the funded ratio drops, the likelihood of the investor's ability to fund desired spending drops.

In more detail, an investor may identify retirement needs and wants. Needs are assumed to be relatively inelastic spending goals, such as housing, food, and healthcare-related costs. Wants are assumed to be more elastic spending goals that may include travel, hobbies, or other more discretionary types of spending. In the absence of specific investor needs and wants (e.g., if the information has not been provided by the investor), the server computer system 110 creates estimates of these values, which allows the financial simulator 117 to adjust spending goals depending on funded ratios and configured priorities and to compute overall utility per simulation. For example, if the funded ratio declines past a certain threshold spending would assumed to decline. Alternatively, if the funded ratio increases beyond certain thresholds, future spending may increase.

At operation 550, the financial simulator 117 computes a participant utility metric or investor utility metric based on a utility transfer function based on investor needs and wants. In some embodiments, the financial simulator 117 uses a non-linear utility function to evaluate the expected satisfaction of achieving a retirement goal. In other words, the ability of the accounts, pension, and social insurance income to fund needs and wants is transformed into a utility score. Utilities are aggregated across the simulation and reported to the investor.

In some embodiments, the utility function is segmented into three ranges based on how the given level of consumption relates to the total income goal for that year. The expected utility (u) of a given amount of income (i) for a given year (t) is based on the respective total income goal (g) being completed. Total utility is based on the percentage of the overall goal that is defined as a need (n), or is nondiscretionary, as well as an income risk aversion level (γ) for that level of income. The risk aversion parameter is based on whether spending is satisfying a needs utility, wants utility, or what would be considered excess utility (more than the target income amount) based on equations 1, 2, and 3, respectively.

$$\text{If } \frac{i}{g} \le n \text{ then } u_t = \left(\left(\frac{1}{\frac{i_t}{(g(n))^{-\gamma_n}}}\right)n\right)g \tag{1}$$

$$\text{If } \frac{i}{g} > n \text{ and } \frac{i}{g} \le 1 \text{ then } u_t = \left((g(n)) + \left(\left(\frac{1}{\frac{(i_t - (g(n)))}{(g-(g(n)))^{-\gamma_w}}}\right) * (1-n)\right)\right)g \tag{2}$$

$$\text{Else } u_t = \left(\frac{1}{\left(\frac{i_t}{g}\right)^{-\gamma_e}}\right)g \tag{3}$$

Figure 6A:
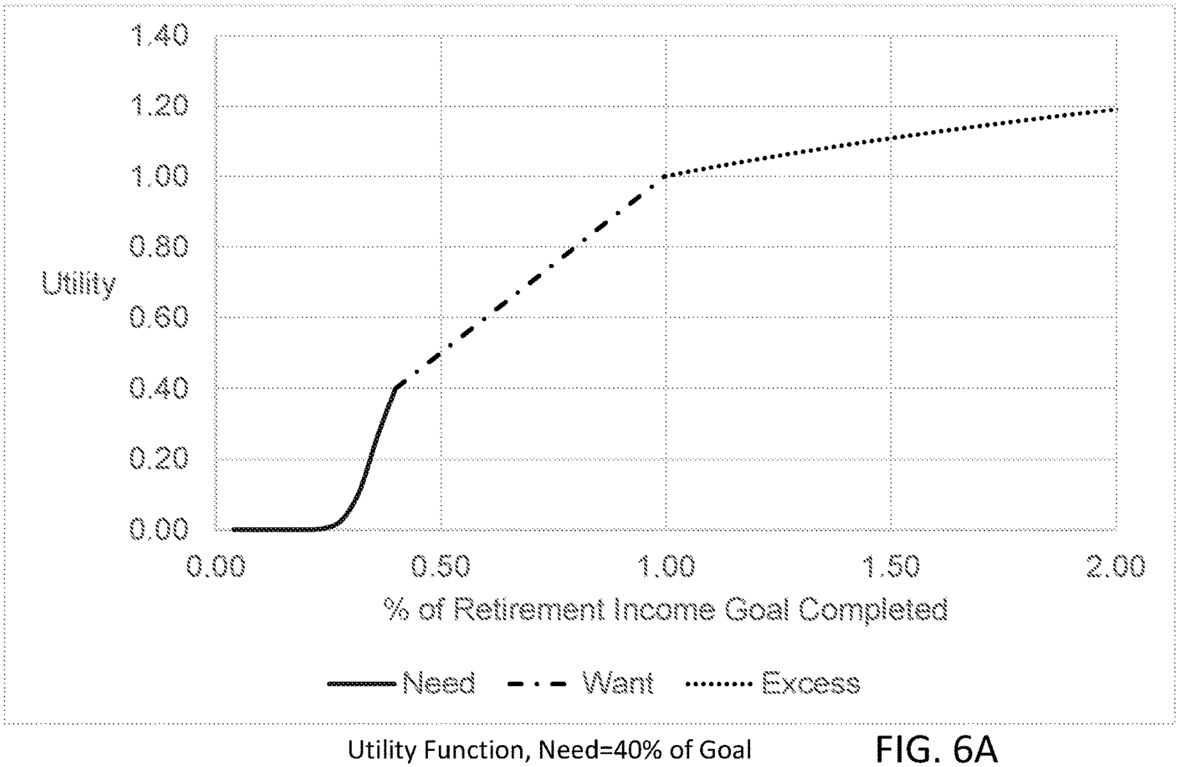
FIGS. 6A and 6B are examples of utility functions for goal completion based on different levels of needs as a percentage of the goals.
Figure 6B:
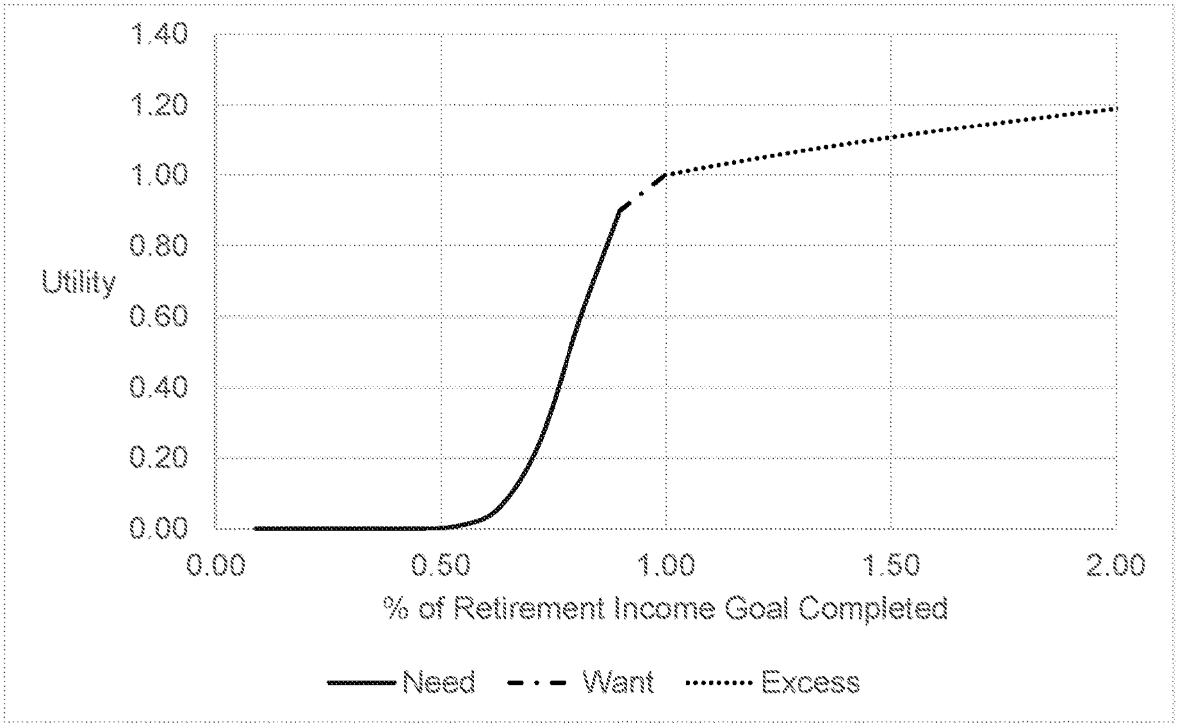

Assuming, for example, an income risk aversion level (γ) corresponding to a triple of (4, 1, 0.25) for needs, wants, and excess, respectively, the financial simulator 117 generates expected utility values for various levels of spending. Examples that represent utility as a function of income (expressed as a percentage of income goal) when the investor needs are set to 40% and 90% of the income goal are shown in FIG. 6A and FIG. 6B, respectively. For example, as shown in FIG. 6A and FIG. 6B, an investor is assumed to have zero utility when their income is less than 50% of their needs (e.g., an investor is very unhappy when their basic needs are not met), and utility rises with income as those needs are met. The marginal increase in utility (the slope of the function) is not as steep after the investor needs are met, as the investor has income to spend on their wants. Spending in excess of the investor's wants has even lower marginal utility (e.g., spending on things that the investor did not particularly want). The utility of consumption is computed for each year of retirement.

At operation 560, the financial simulator 117 computes interim adjustments, as appropriate, based on the computed funded ratio and/or the computed investor utility metric. These interim adjustments are reflective of observed retiree behavior. If for example, a retiree is underfunded they will tend to reduce their wants spending in that year. Accordingly, at 560 the financial simulator 117 reduces wants spending for the following period of the current simulation path by some factor (e.g., 0.98, but configurable to other values or computed as a function of other simulation parameters) in order to improve the funded ratio on that particular current simulation path. Likewise, per observed retiree behavior in some embodiments at 560, when the retiree is overfunded, the financial simulator 117 increases the wants spending by a factor (e.g., 1.02, but configurable to other values or computed as a function of other simulation parameter). All simulations are run and if necessary, this adjustment is accomplished at every step. The adjusted asset balances are then included as the starting asset balances for the next iteration of the financial simulation.

Referring back to FIG. 3, at operation 350, the financial simulator 117 determines whether the simulation is complete, such as based on whether all of the iterations have been complete, and the simulation has run until the end of the retirement period (e.g., up until the life expectancy of the investor). If there are more iterations to be performed (e.g., the end of the retirement has not yet been reached), then the financial simulator 117 returns to operation 330 to perform another iteration of the stochastic simulation, using the ending balances computed by the previous iteration of the stochastic simulation as the starting balances for the current iteration. If there are no more iterations to be performed (e.g., the end of the forecast retirement period has been reached for all of the simulation paths), then the financial simulator proceeds with operation 370.

At operation 370 the financial simulator 117 computes a goal completion score based on the participant utility metrics computed for each iteration of the simulation (e.g., where, each participant utility metrics corresponds to one of the periods of the simulation, such as a year of simulated time) in the progress from the investor's current age to the end of their retirement. A goal completion score is a metric through which the financial simulator 117 communicates the efficacy of a retirement plan to the investor as a percentage of goal completed, adjusted for utility. The financial simulator 117 estimates the constant amount of income with the same utility as the actual income path (II). This represents the utility-equivalent constant income level, illustrated by equation 4, where $u_t$ is the utility-adjusted income in year t, $q_t$ is the probability of surviving to at least year t, T is the final year of retirement (e.g., the length of the assumed simulation or the end of retirement year), and ρ is the investor's subjective real discount rate.

$$II = \left(\frac{\sum_{t=0}^{T} q_t(1+\rho)^{-t}u_t}{\sum_{t=0}^{T} q_t(1+\rho)^{-t}}\right) \tag{4}$$

Returning to FIG. 2, at operation 250, the server computer system 110 evaluates goal completion scores for one or more scenarios computed by the financial simulator 117.

The overall expected utility is measured using a utility function ($U_t$) with a risk tolerance parameter (λ) as shown in equation 5, where R is the number of simulation paths (or simulation runs), $p_i$ is the probability of path i occurring (which, in some embodiments, is set to 1/R in a case where it is assumed that each simulation path is equally likely, but where embodiments of the present disclosure are not limited thereto, and where different simulation paths may be weighted with different probabilities, and where the sum of the probabilities of the simulation paths is equal to 1), and $U_t$ is the certainty-equivalent of the stochastic utility-adjusted income II.

$$U_t = \left[\sum_{i=1}^{R} p_i(II_i)^{-\lambda}\right]^{\frac{1}{-\lambda}} \tag{5}$$

The financial simulator 117 then generates an outcome metric that is accessible to retirees by dividing the certainty-equivalent utility-adjusted income ($U_t$) by the income goal (g), yielding a metric that is referred to as the "goal completion score" as shown in equation 6.

$$\text{Goal Completion Score} = U_t/g \tag{6}$$

In some embodiments of the present disclosure, advice is generated through computing the goal completion score given a cartesian product of varied savings rates with varied desired retirement ages. This framework provides a natural mechanism to vary other parameters, for example, a location of retirement residence (where different locations are associated with different costs of living), and to find advice to provide to the investor (e.g., based on actions that appear to be optimal or near optimal in accordance with the simulation runs).

For example, in some embodiments an advice generator 119 receives the simulation results from the financial simulator 117, where the simulation results may include the goal completion score. The advice generator 119 of the server computer system 110 computes recommended actions based on the simulation results. Examples of recommended actions include, but are not limited to, delaying retirement, increasing savings rates, and reducing consumption plans (e.g., adjusting the investor needs and wants) based on configurable priorities. This trade-off continues to optimize utility given, for example, the account balances, asset returns, taxes, and pension benefits (and like cash flows).

The advice generator 119 uses the goal completion scores to rank the efficacy of various points in the configured search space, where each point in the search space corresponds to combinations of, for example, a savings rate, a retirement age, and a spending goal. For example, the advice generator 119 may apply a pre-configured set of savings rates (e.g., 10%, 15%, and 30%) and a pre-configured set of retirement ages (e.g., 60, 65, and 70). A cartesian product of the set of savings rates and the set of retirement ages creates a matrix of possible combinations of savings rates and retirement ages (continuing the example, nine possible combinations of the three pre-configured savings rates and the three pre-configured retirement ages) of the search space. In this example, each combination of savings rate and retirement age representing a different part of the search space, is computed and the server computer system 110 computes a goal completion score for each combination of savings rate and retirement age. In some embodiments, the advice generator 119 provides the combination that corresponds to the highest score which satisfies goal completion objectives as advice to the investor.

In some embodiments, the advice generator determines if the forecast is satisfactory at operation 260, such as based on whether any of the combinations results in a goal completion score greater than or equal to 1.0 or whether a threshold number of combinations has a corresponding goal completion score greater than or equal to 1.0. If the forecast is determined to be unsatisfactory, then at operation 270 the advice generator generates advice including savings rate and retirement age advice. For example, an investor may wish to retire at 65, and the simulation results may find that a savings rate of 10% results in a goal completion score of 1.0, but increasing the savings rate to 12% and retiring at 66 will bring that investor's goal completion score above 1.0. In such a case the advice generator 119 according to some embodiments of the present disclosure would report that, by increasing savings to 12% and retiring at 66, a satisfactory retirement plan can be achieved. At operation 280, the advice generator 119 displays the generated advice, such as by returning a message containing the advice to the user interface server 111, which communicates the generated results (e.g., the advice and the simulation results) to the end-user device 102, where the generated results may be presented (e.g., displayed) through a user interface of the end-user device 102. If the forecast was determined to be satisfactory at operation 260, then the advice generator reports the satisfactory outcome to the investor at operation 290 (e.g., indicating a combination of retirement age and savings rate that results in a goal completion score greater than or equal to 1.0).

Based on this generated advice, the investor may provide additional information to the server computer system 110 through the end-user device 102 in order to update the configuration of the simulation. Examples of additional information include, but are not limited to: level of education, gender, health status, additional assets (e.g., outside savings), pension participation, and risk tolerance. This additional information is supplied to the simulation configurator 113, which combines the information with other information that may have previously been received from the investor to generate an updated configuration package for configuring the simulation to perform a new set of simulation runs. Accordingly, embodiments of the present disclosure enable investors to iteratively update the information and assumptions provided to the financial simulator in order to explore potential approaches to achieving their retirement goals.

Investor engagement generally results in better retirement planning outcomes. Accordingly, some aspects of embodiments of the present disclosure relate to performing the simulation in a manner than maintains sub-one second results. In some embodiments of the present disclosure, latency is improved by using a low-level programming language (e.g., the C programming language and/or assembly language) in order to decrease the per-simulation execution time. Additionally, some aspects of embodiments of the present disclosure relate to distributing the simulation (e.g., distributing the simulation runs) across multiple processing circuits operating in parallel (e.g., simultaneously). Each processing circuit computes a goal completion score for a particular savings rate/retirement age combination, then the controlling container aggregates the outcomes and reports results. In some embodiments, the simulation is distributed across multiple containers or virtual machines, where the containers or virtual machines are executed on different hardware (e.g., different processor cores in the same physical machine, in different physical machines, or combinations thereof).

Some aspects of embodiments of the present disclosure relate to reducing latency by based on configuring the search space. In some embodiments, the goal completion scores and/or the utility metrics are used to further configure the search space, such that, after computing utility scores for a set of combinations of parameters (e.g., retirement age and saving rate), the financial simulator 117 returns to operation 230 to reconfigure the search space based on those utility scores and to select different combinations of parameters to perform a further search. As one example, in a case where the search space is defined by combinations of a retirement age and a saving rate, an investor may initially specify a retirement age of 65 and a saving rate of 10%. In some embodiments, the bounds of the search space are heuristically defined, such as by searching the combinations of retirement age/saving rate of age 65/10%, age 65/11%, age 65/12%, . . . , age 65/14%, age 66/11%, age 66/12%, . . . , age 66/15%, age 67/10%, . . . , age 67/16%. (In this example, the range of savings rates differ for each retirement age.) For each retirement age, the endpoint savings rates are then simulated (in this example, age 65/10%, age 65/14%, age 66/11%, age 66/15%, age 67/10%, and age 67/16%, resulting in six simulations) in a first pass, that has a significantly reduced search space than the full space of seventeen combinations. The utility score associated with each of the simulations of the first pass are compared with a utility threshold, and the lowest age which crosses that utility threshold is then used to perform a second pass. For example, if it was determined that 66 was the minimum retirement age that crossed the utility threshold, then additional simulations would be run for that age (in this example, age 66/12%, age 66/13%, and age 66/14% were the combinations that have not yet been run, because age 66/11% and age 66/15% were part of the first pass). As noted above, for any given pass, the simulations may be run in parallel across multiple processors, and different simulation paths within a simulation may also be distributed across multiple processors.

Figure 7:
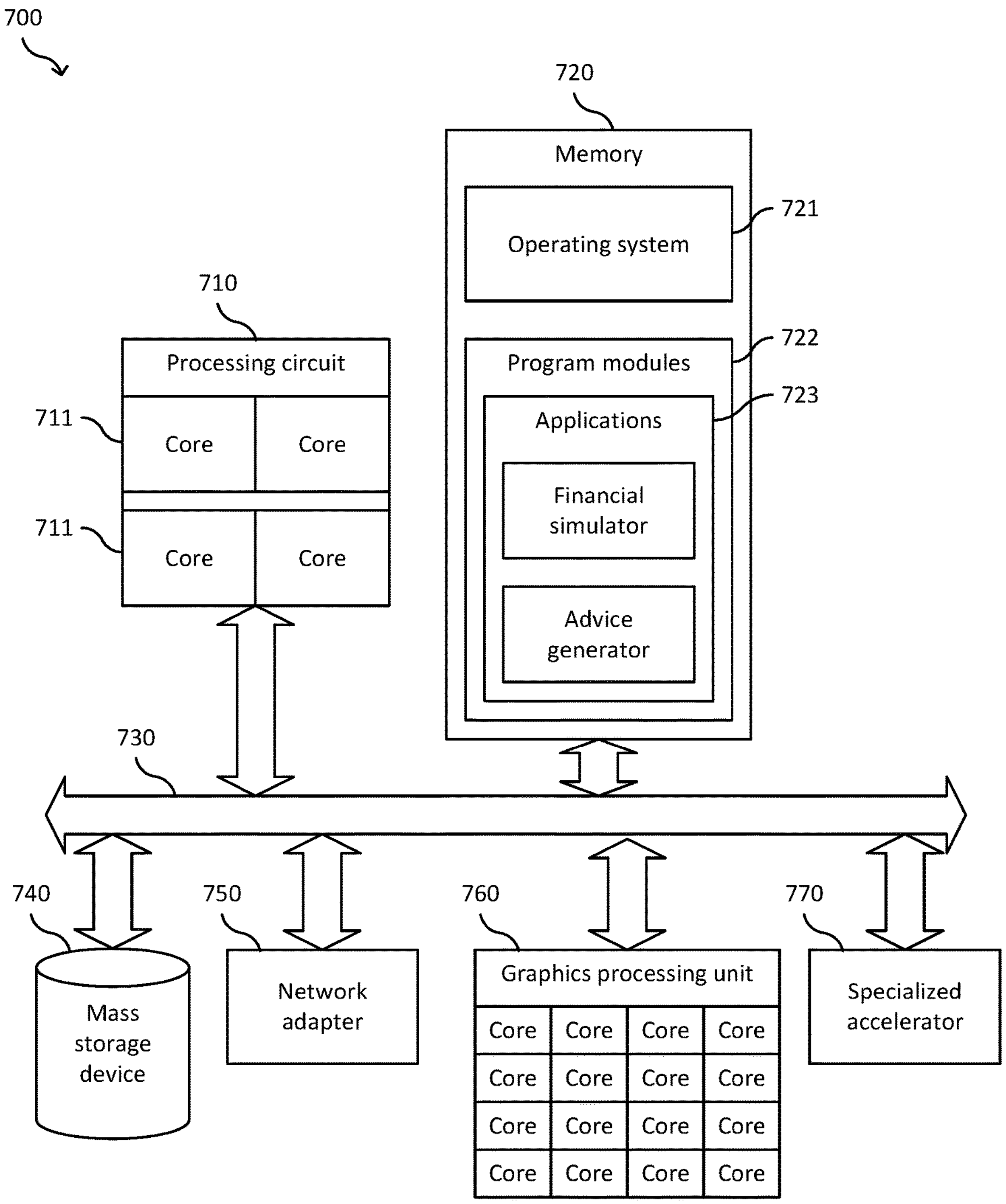
FIG. 7 is a block diagram of an example computing device including a processing circuit and memory.

FIG. 7 is a block diagram of an example computing device including a processing circuit and memory. As shown in FIG. 7, a computing device 700 includes a or processor or processing circuit 710 and memory 720. The memory may include, but is not limited to, volatile memory (e.g., dynamic random-access memory), non-volatile memory (e.g., flash storage devices, solid state drives, and hard disk drives), and combinations thereof. The memory 720 may store an operating system 721 and one or more program modules 722 suitable for running software applications 723 such as components of the server computer system 110 described above (e.g., the user interface server 111, the simulation configurator 113, the database 115, the financial simulator 117, and the advice generator 119). Accordingly, the memory 720 stores instructions that are executed by the processing circuit 710, thereby configuring the processing circuit 710 to be a special purpose machine that performs operations as specified by the instructions. The operating system 721 may provide an abstraction layer that provides an application programming interface (API) for the program modules 722 to interact with the hardware of the computing device 700.

The processing circuit 710 may include one or more processor cores 711, where each processor core 711 is an electrical circuit that is configured to perform computations based on supplied instructions. A given processor core 711 may include a an arithmetic-logic unit (ALU) configured to perform arithmetic and logic operations, processor registers for storing operands that are supplied to the ALU and storing results that are computed by the ALU, and a control unit that fetches instructions from the memory 720, decodes the instructions and controls the operations of the ALU, the registers, and other components to execute the instructions on data retrieved from the memory 720.

The processing circuit may be an electrical circuit including discrete electronic elements, packaged, or integrated electronic chips containing logic gates, on a single chip containing electronic elements or microprocessors. For example, examples of the invention may be practiced via a system-on-a-chip (SoC) where each or many of the components illustrated in FIG. 7 may be integrated onto a single integrated circuit. Such an SoC device may include one or more processing units, graphics units, communications units, system virtualization units and various application functionality all of which are integrated (or "burned") onto the chip substrate as a single integrated circuit. Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a general-purpose computer or in any other circuits or systems.

The processing circuit 710 and the memory 720 are connected to peripheral devices through a peripheral bus 730 (such as a Peripheral Component Interconnect Express or PCIe bus). Examples of peripheral devices include, but are not limited to, mass data storage devices 740 (e.g., solid state drives or hard disk drives), network adapters 750 (e.g., for connecting to computer networks), graphics processing units 760, and specialized accelerators 770 (e.g., for neural network processing, encryption, video encoding, and the like).

As discussed above, in some embodiments of the present disclosure, various aspects of the simulation are distributed across multiple processor cores 711 to reduce latency by simulating different parts of the search space simultaneously. While FIG. 7 shows four cores 711 in a processing circuit 710 of a single computing device, embodiments of the present disclosure are not limited thereto. For example, the cores of the graphics processing unit 760 and specialized accelerators 770 may also participate in executing computations relating to the financial simulation.

Figure 8:
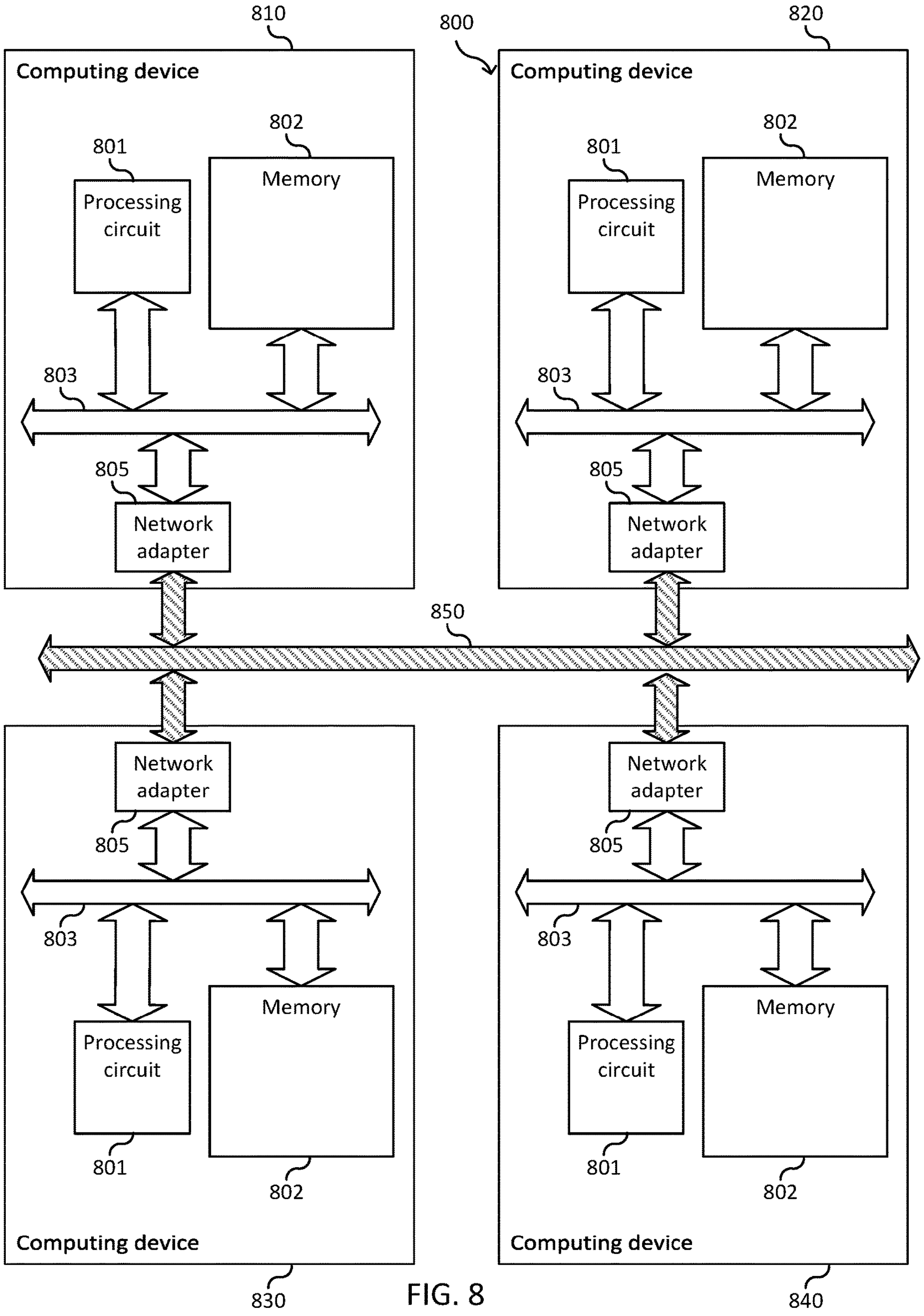
FIG. 8 is a schematic depiction of a server computer system that includes multiple computing devices.

FIG. 8 is a schematic depiction of a server computer system 800 that includes multiple computing devices 810, 820, 830, and 840. Each of the computing devices includes a processing circuit 801, a memory 802, a peripheral bus 803, and a network adapter 805. Each computing device may further include other peripheral devices (not shown) similar to the computing device 700 shown in FIG. 7. The network adapters 805 of the computing devices may be connected to a computer network 850 such that the computing devices (e.g., 810, 820, 830, and 840) may communicate with one another and exchange data. Accordingly, in some embodiments of the present disclosure, the simulation runs are distributed across the multiple computing devices. For example, one computing device 810 may operate as a coordinator that distributes computing tasks (e.g., parameters for different simulation runs) to other computing devices (e.g., 820, 830, and 840) and collects the results generated by the other computing devices.

The term computer readable media as used herein may include computer storage media. Computer storage media may include volatile and nonvolatile, removable and non-removable media implemented in any method or technology for storage of information, such as computer readable instructions, data structures, or program modules. The memory 720 and the mass data storage device 740 are examples of computer storage media (i.e., memory storage.) Computer storage media may include random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method comprising:

receiving, by a computer system comprising a processing circuit and memory, investor information comprising an initial investment balance, an age of an investor, a current income, and a desired retirement age;

configuring, by the computer system, econometric models based on the investor information to compute a range of potential investment balances and a present value of decumulation, investor needs, investor wants, and account balances;

simulating, by the computer system, an investment portfolio of the investor over a plurality of simulation paths, each of the simulation paths corresponding to a different stochastic simulation of the investment portfolio over a plurality of periods based on the econometric models configured with the investor information, wherein each of the plurality of simulation paths correspond to a different portion of a search space of combinations of parameters of the different stochastic simulation, the search space of parameters comprising combinations of retirement ages and savings rates, each of the simulation paths being independent of one another and corresponding to a different combination of a retirement age and a savings rate, and wherein the plurality of simulation paths are distributed across multiple processing circuits executing in parallel;

computing, by the computer system, a goal completion score for each of the simulation paths based on an associated present value of assets and the investor wants and needs;

generating, by the computer system, advice based on the goal completion score for each of the simulation paths, comprising aggregating the goal completion scores computed by the multiple processing circuits simulating the investment portfolio over the plurality of simulation paths; and displaying the advice in a user interface connected to the computer system.

2. The method of claim 1, wherein the advice is generated by the computer system in near real-time in response to receiving the investor information.

3. The method of claim 1, wherein the econometric models comprise:

a first econometric model configured to perform stochastic estimation of the range of potential investment balances over a period; and a second econometric model configured to compute the present value of decumulation wants, needs, and account balances over the period.

4. The method of claim 1, further comprising computing an investor utility metric for each of the plurality of periods of a simulation path of the simulation paths, wherein the goal completion score associated with the simulation path of the simulation paths is computed based on the investor utility metric computed for corresponding ones of the plurality of periods of the simulation path, and wherein the investor utility metric is computed based on a non-linear utility function in accordance with the investor needs and the investor wants.

5. The method of claim 4, wherein the non-linear utility function assigns poor utility to adverse outcomes and reduced marginal utility to positive outcomes.

6. The method of claim 1, wherein simulating a period of the plurality of periods of a simulation path of the simulation paths comprises:

applying starting balances, income, withdrawals, savings rates, and simulated asset allocation returns to stochastic simulation of asset returns and spending for the period;

computing updated investor information for an end of the period; and computing a funded ratio for the investor for the period.

7. The method of claim 1, wherein the investor information further comprises at least one selected from a group comprising:

health information regarding the investor;

spending desires of the investor;

a gender of the investor; and information regarding a spouse of the investor.

8. The method of claim 1, further comprising:

receiving additional investor information;

reconfiguring the econometric models based on the additional investor information;

simulating the investment portfolio of the investor over a second plurality of simulation paths, each of the second plurality of simulation paths corresponding to different stochastic simulations of the investment portfolio over a plurality of periods based on the econometric models configured with the additional investor information;

computing, by the computer system, a second goal completion score for each of the second plurality of simulation paths based on an associated present value of assets and the investor wants and needs;

generating, by the computer system, updated advice based on the second goal completion score associated with each of the second plurality of simulation paths; and displaying the updated advice in the user interface connected to the computer system.

9. The method of claim 1, wherein the search space of parameters further comprises a spending goal.

10. The method of claim 9, wherein the goal completion score for a simulation path is computed based on the spending goal and a result of the investment portfolio over the simulation path.

11. A system comprising:

a processing circuit; and memory storing instructions that, when executed by the processing circuit, cause the processing circuit to:

receive investor information comprising an initial investment balance, an age of an investor, a current income, and a desired retirement age;

configure econometric models based on the investor information to compute a range of potential investment balances and a present value of decumulation, investor needs, investor wants, and account balances;

simulate an investment portfolio of the investor over a plurality of simulation paths, each of the simulation paths corresponding to a different stochastic simulation of the investment portfolio over a plurality of periods based on the econometric models configured with the investor information, wherein each of the plurality of simulation paths correspond to a different portion of a search space of combinations of parameters of the different stochastic simulation, the search space of parameters comprising combinations of retirement ages and savings rates, each of the simulation paths being independent of one another and corresponding to a different combination of a retirement age and a savings rate, and wherein the plurality of simulation paths are distributed across multiple processing circuits executing in parallel;

compute a goal completion score for each of the simulation paths based on an associated present value of assets and the investor wants and needs;

generate advice based on the goal completion score for each of the simulation paths, comprising aggregating the goal completion scores computed by the multiple processing circuits simulating the investment portfolio over the plurality of simulation paths; and display the advice in a user interface.

12. The system of claim 11, wherein the system is configured to generate the advice in near real-time in response to receiving the investor information.

13. The system of claim 11, wherein the econometric models comprise:

a first econometric model configured to perform stochastic estimation of the range of potential investment balances over a period; and a second econometric model configured to compute the present value of decumulation wants, needs, and account balances over the period.

14. The system of claim 11, wherein the memory further stores instructions that, when executed by the processing circuit, cause the processing circuit to compute an investor utility metric for each of the plurality of periods of a simulation path of the simulation paths, wherein the goal completion score associated with the simulation path of the simulation paths is computed based on the investor utility metric computed for corresponding ones of the plurality of periods of the simulation path, and wherein the investor utility metric is computed based on a non-linear utility function in accordance with the investor needs and the investor wants.

15. The system of claim 14, wherein the non-linear utility function assigns poor utility to adverse outcomes and reduced marginal utility to positive outcomes.

16. The system of claim 11, wherein the instructions to simulate a period of the plurality of periods of a simulation path of the simulation paths comprise instructions that, when executed by the processing circuit, cause the processing circuit to:

apply starting balances, income, withdrawals, savings rates, and simulated asset allocation returns to stochastic simulation of asset returns and spending for the period;

compute updated investor information for an end of the period; and compute a funded ratio for the investor for the period.

17. The system of claim 11, wherein the investor information further comprises at least one selected from a group comprising:

health information regarding the investor;

spending desires of the investor;

a gender of the investor; and information regarding a spouse of the investor.

18. The system of claim 11, wherein the memory further stores instructions that, when executed by the processing circuit, cause the processing circuit to:

receive additional investor information;

reconfigure the econometric models based on the additional investor information;

simulate the investment portfolio of the investor over a second plurality of simulation paths, each of the second plurality of simulation paths corresponding to different stochastic simulations of the investment portfolio over a plurality of periods based on the econometric models configured with the additional investor information;

compute a second goal completion score for each of the second plurality of simulation paths based on an associated present value of assets and the investor wants and needs;

generate updated advice based on the second goal completion score associated with each of the second plurality of simulation paths; and display the updated advice in the user interface.

19. A non-transitory computer readable medium storing instructions that, when executed by a processing circuit, cause the processing circuit to:

receive investor information comprising an initial investment balance, an age of an investor, a current income, and a desired retirement age;

configure econometric models based on the investor information to compute a range of potential investment balances and a present value of decumulation, investor needs, investor wants, and account balances;

simulate an investment portfolio of the investor over a plurality of simulation paths, each of the simulation paths corresponding to a different stochastic simulation of the investment portfolio over a plurality of periods based on the econometric models configured with the investor information, wherein each of the plurality of simulation paths correspond to a different portion of a search space of combinations of parameters of the different stochastic simulation, the search space of parameters comprising combinations of retirement ages and savings rates, each of the simulation paths being independent of one another and corresponding to a different combination of a retirement age and a savings rate, and wherein the plurality of simulation paths are distributed across multiple processing circuits executing in parallel;

compute a goal completion score for each of the simulation paths based on an associated present value of assets and the investor wants and needs;

generate advice based on the goal completion score for each of the simulation paths, comprising aggregating the goal completion scores computed by the multiple processing circuits simulating the investment portfolio over the plurality of simulation paths; and display the advice in a user interface.

20. The non-transitory computer readable medium of claim 19, wherein the instructions configure the processing circuit to generate the advice in near real-time in response to receiving the investor information.

* * * * *